United States Patent [19]

Acda

[11] 3,989,440
[45] Nov. 2, 1976

[54] DEVICE FOR SHAPING A BELL END TO A TUBE

[75] Inventor: Petrus Marinus Acda, Oosterhaven, Enkhuized, Netherlands

[73] Assignee: Polva-Nederland N.V., Enkhuizen, Netherlands

[22] Filed: Nov. 29, 1974

[21] Appl. No.: 528,117

Related U.S. Application Data

[62] Division of Ser. No. 100,296, Dec. 21, 1970, Pat. No. 3,853,450.

[52] U.S. Cl. ............................. 425/393; 264/318; 425/457; 425/460; 425/DIG. 218
[51] Int. Cl.² ........................................ B29C 17/02
[58] Field of Search ............ 425/DIG. 218, DIG. 14, 425/DIG. 58, 384, 392, 393, 394, 457, 460; 264/318, 334, 314; 72/393, 316, 317, 478

[56] References Cited
UNITED STATES PATENTS

| | | | |
|---|---|---|---|
| 3,205,535 | 8/1965 | Niessner et al. | 425/393 |
| 3,377,659 | 4/1968 | Hucks | 425/457 |
| 3,728,059 | 4/1973 | DePutter | 425/155 |

FOREIGN PATENTS OR APPLICATIONS

516,098  12/1939  United Kingdom

Primary Examiner—Francis S. Husar
Assistant Examiner—R. J. Charvat
Attorney, Agent, or Firm—Nolte and Nolte

[57] ABSTRACT

The present invention relates to a device for shaping a bell end to a tube of a thermoplastic material, the bell end comprising at least one inner surface (widening) having a larger diameter than that of its opening, the latter extending downward to the outer surface of the tube or of the spigot end to be introduced, said device being provided with a cylindrical mandrel, having an outer profile being almost like the inner profile of the bell end to be shaped, said mandrel having from its insert or front end an outer surface with stepwise varying diameter, the transition between adjacent mandrel surfaces of different outer diameter gradually merging under an angle less than 45° with respect to the axis, the front end of said mandrel having an edge portion inclining forwardly and downwardly, the smallest inner diameter of which being smaller than the inner diameter of the tube.

4 Claims, 3 Drawing Figures

DEVICE FOR SHAPING A BELL END TO A TUBE

This is a division of application Ser. No. 100,296, filed Dec. 21, 1970 and issued as U.S. Pat. No. 3,853,450 on Dec. 10, 1974.

With such a device applied to manufacture a bell end to a tube, according to Dutch Pat. No. 121,936 in the name of applicants, after expanding during heating of the tube end for shaping same with two widened portions, a sealing ring of rubber or similar material having an axially extended lip portion, inclining downwardly and inwardly, being mounted on a clamping ring of preferably the same material as that of the tube and with its lip directing forwardly, is positioned in the largest of both widenings of the bell end.

Thereafter, the end edge-portion of the coupling member joining the above mentioned largest widened portion is shaped on applying heat and compression of the sealing ring, which can be done in a known way by means of either a mechanical tool, or a compression medium engaging the outer surface of the sleeve.

Although with this final shaping of the bell end of the tube, on using the clamping ring with the resilient sealing ring enveloping same as "shaping-mandrel", a circumferentially uniform flat surface is obtained of said portion of the inner surface of the bell end, said surface in the nature of things is in-exact in measure.

The present invention aims at providing a device as described in the preamble, by means of which the bell end cannot only be given a circumferentially uniform flat inner surface, but moreover the inner surface along the entire axial dimension of the bell end can accurately be calibrated.

To that end in an embodiment according to the present invention the mandrel comprises a portion of a hard material, the rear end of said portion having an outer surface with a largest diameter which is at least almost like the diameter of the outer surface of the tube portion joining the bell end to be shaped and an annular portion or "shaping-ring", which is slidable on the first mentioned portion of the mandrel, said shaping-ring having locally at least one outer surface with a diameter being larger than the largest diameter of the outer surface of the first mentioned mandrel-portion, said shaping-ring being made of a mterial having a hardness between that of the thermoplastic material of the bell end to be shaped at the ambient temperature and that at the deforming temperature thereof and which shaping ring has at least locally a surface with an inner diameter which is less than the largest diameter of the outer surface of the first mentioned mandrel portion, said shaping ring joining the said edge portion.

Herewith on mutual axial movement of the bell end and the device according to the invention the surface of the shaping ring having locally a larger outer diameter than the largest diameter of the outer surface of the first mandrel portion has been intended for calibratedly shaping the widened portion(s) which has(have) a larger inner diameter than the largest diameter of the outer surface of the first mandrel portion, whereas the portion of the shaping ring having at least locally a surface with inner diameter less than the largest diameter of the outer surface of the first mandrel portion has been intended for abutment, to prevent backward sliding movement of the shaping ring past a predetermined location at the first mandrel portion under influence of the frictional forces arising during mutual axial movement of the tube and the device.

Although with regard to the substantially radial forces required for expanding the tube, the material of the shaping ring should have a special shape and degree of hardness, it is desired with a view to the simultaneously arising frictional forces to take care that during the mutual axial movement of the tube and the device according to the invention, the radial dimension of the shaping ring which is slidable along the first mandrel portion, remains fixed on said predetermined location.

For that purpose in a further embodiment of the device according to the present invention the shaping ring has been provided with means for preventing deformation of the shaping ring radial outwardly.

To this end, in a simple embodiment of the device according to the invention the inner surface of the shaping ring has been provided with longitudinal ribs engaging longitudinal grooves in the outer surface of the first mentioned mandrel portion.

Such an embodiment of the device according to the invention provides in a simple way the abutment, which prevents further backwards sliding movement of the shaping ring, the means to prevent or inhibit radial deformation or expansion of the shaping ring.

The cross section of grooves as well as ribs may then advantageously be dovetail-shaped.

In order to obtain a further security against radial sliding movement or deformation of the shaping ring, the rear end of the shaping ring according to another embodiment of the device according to the present invention has an edge portion extending in axial direction to below the contiguous outer surface of the first mentioned mandrel portion.

The present invention still comprises another embodiment which is characterized in that a portion at the front end of the mandrel with its edge portion, is constitued by a separate sleeve-like portion of a similar hard material as the first mentioned mandrel-portion, said sleeve-like portion having an outer surface the largest diameter of which is at least almost like that of the outer surface of the tube portion joining the bell end to be shaped, said sleeve-like portion being slidable upon the first mentioned mandrel portion, however, in its operative position, has been secured against sliding backward, such that the shaping ring has then correctly been fixed without deformation.

By means thereof the uniformity of the outer profile along the entire length of the mandrel will be secured.

In the last mentioned embodiment of the device according to the invention the shaping ring has advantageously an edge portion at its front end, said edge portion extending in axial direction to below the outer surface of the sleeve-like portion. Thus the security of the shaping ring against each undesired sliding movement or deformation is still further secured.

A preferred embodiment of the device according to the invention is characterized in that the "sleeve-like" portion in its operative position is adapted to be clamped against the first mentioned mandrel portion, the latter being centrally bored, through which bore a rod is axially slidable, being provided with hooks which are adapted to pivot radial outwardly against spring pressure, said hooks then engaging the sleeve-like portion with an axially directed pressure force.

A further advantage of the device according to the present invention is the simplicity of the construction constituting the shaping surface, said construction either comprising merely a shaping ring which has a limited slidable movement along a first portion, or beside these portions, still comprising a sleeve portion which has a limited slidable movement along said first mentioned portion.

The present invention will now be elucidated with the aid of several embodiments shown schematically in the accompanying drawings, in which.

Figure 1:
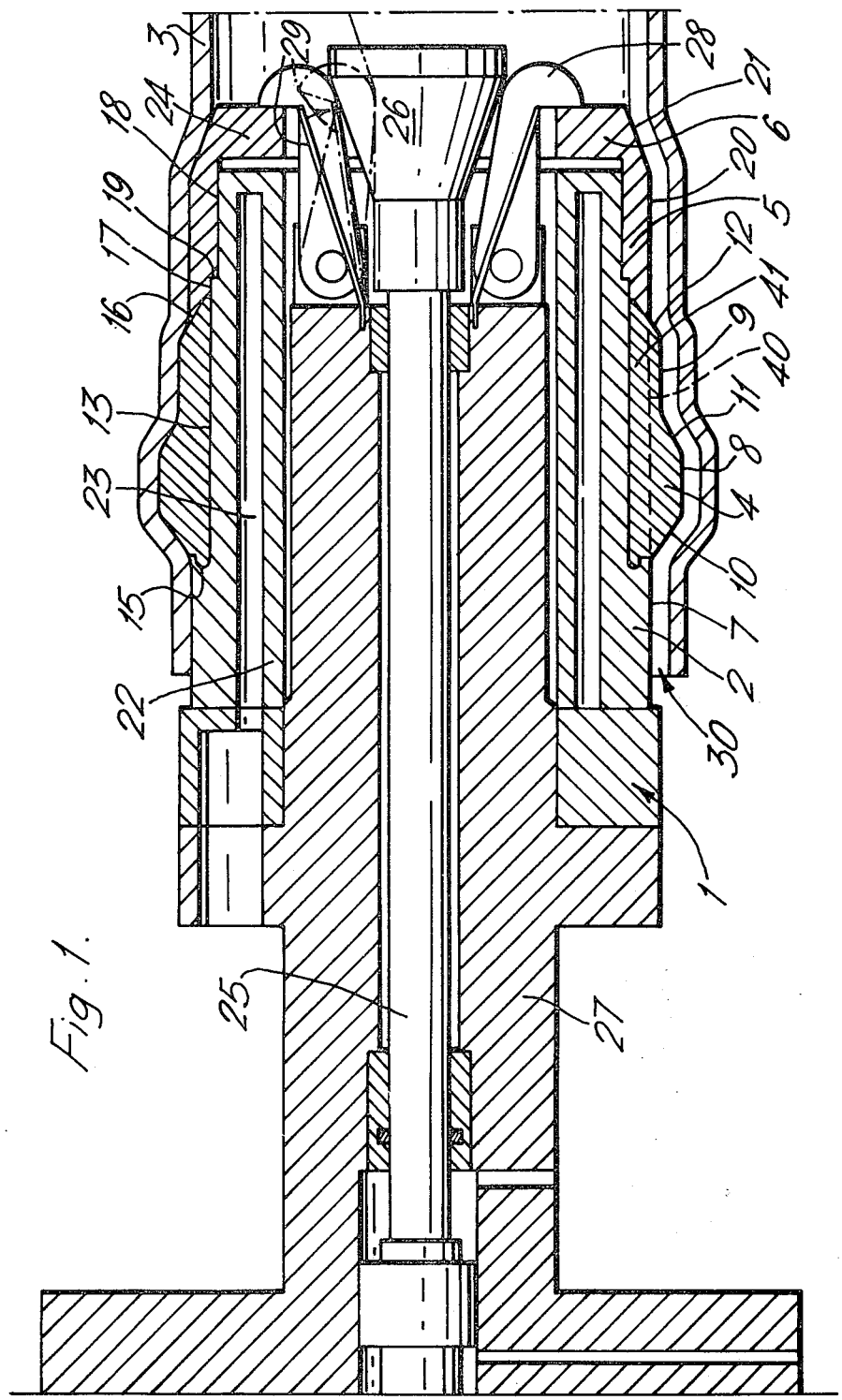
FIG. 1 is an axial section of a preferably applied embodiment of the device in which the mandrel comprises a first mandrel portion, along which a shaping ring and a sleeve-like portion are axially slidable, and the tube to be deformed and the mandrel have mutually axially been moved along the correct dimension.

The embodiment of the device shown in FIG. 1 has been provided with a cylindrical mandrel, generally indicated by the numeral 1, comprising a central cylindrical member portion 2 of a hard material, e.g. metal, the rear end of which having an outer surface with a largest diameter which is at least almost like the diameter of the outer surface of the tube portion 3 joining the bell end to be shaped, an annular portion or shaping ring 4 slidable along the said portion 2 and a portion 5 at the front end of the mandrel, which portion 5 together with an end edge portion 6 of the mandrel constitute a separate sleeve-like portion, also being slidable along the mandrel portion 2 and of which the material, e.g. may be the same as of the first mandrel portion.

The rear end of the mandrel portion 2 has an outer surface 7 with a largest diameter which is at least almost like the diameter of the outer surface of the tube 3 of a thermoplastic material.

The mandrel portion, indicated as shaping ring 4, has at two locations 8, 9 an outer surface with a diameter which is larger than the largest diameter of the outer surface 7 of the mandrel portion 2 and has been made of a material having a hardness between that of the thermoplastic material of the bell end to be shaped at the ambient temperature and that at the deforming temperature thereof.

The transitions 10, 11, 12 between adjacent mandrel surfaces having varying outer diameters, merge under an angle of maximally 45° with respect to the axis.

In order to render the shaping ring 4 slidable along the mandrel portion 2 and at the same time to secure same against further backward sliding movement in the position shown, the shaping ring has a surface 13 with an inner diameter less than the largest diameter of the outer surface 7 of the mandrel portion 2.

The base portion of the mandrel portion 2 has been extended forwardly with a cylindrical portion having an outer surface 17 of the same diameter as the inner surface 13 of the shaping ring, which portion ends in a cylindrical portion having an outer surface 18 of less diameter. The cylindrical surfaces 17 and 18 are separated by an upright collar or radial shoulder 19.

Said sleeve-like portion 5 with an end edge portion 6 is slidable along the cylindrical surface 17, 18 of the mandrel portion 2, the collar or shoulder 19, in the position shown, preventing further backward sliding movement of the sleeve-like portion.

The outer surface 20 of the portion 5 has a diameter similar to that of the outer surface 7 of the mandrel portion 2, whereas the outer surface 21 of the edge portion 6 decreases gradually tapering to a diameter less than the inner diameter of the tube 3.

In the position of the sleeve-like portion 5 shown in which same abuts the collar 19 of the mandrel portion 2, the shaping ring has been fixed without deformation correctly in the 'chamber' formed between the portions indicated.

The first mandrel portion 2 is in fact comprising a tube piece 22, the wall of which has an annular recess 23 for cooling the tube piece to the right temperature with a cooling medium during the shaping of the bell end of the tube 3.

The edge portion 6 of the sleeve-like portion 5 comprises an edge 24 extending radially as far as the inner surface of the tube piece 22. A rod 25 having a conically widened end portion 26, is axially slidable within the bores of the tube piece 22 and the edge 24. A cylindrical thick walled tube 27, fixedly connected to the tube piece 22 and along the inner surface of which tube the rod 25 is slidably guided, comprises at its front end a number of pivoting hooks 28 which on sliding backward of the rod, are adapted to move radial outwardly against the pressure of leaf-springs 29, the ends of said hooks then engaging the edge 24 of the sleeve-like portion to maintain said portion firmly pressed against the collar 19 of the mandrel portion 2.

On mutual axial sliding of the tube 3 and the mandrel 1 to the position with regard to the sleeve-like portion 5 and the mandrel portion 2 shown, the tube end in heated condition and, on cooling of the tube portion 22, is gradually widened in three steps, the front portion of the bell end having reached the end-position shown, being pressed against the outer surface of the mandrel e.g. by means of a tool acting from the outside, so that the bell end of the tube 3 the inner profile of which being almost similar to the outer profile of the mandrel, is shaped.

Owing to the shaping ring maintaining its axial and radial dimensions as a consequence of the cooperation between the undercut 15 and the bevelled edge 16 of the sleeve-like portion 5, the bell end obtains a circumferentially uniform flat surface which moreover, is exactly calibrated. The undercut 15 thus inhibits radial expansion of the shaping ring, and the sleeve-like portion 5 clamps the shaping ring against axial displacement. The bevelled edge 16 also inhibits radial expansion of the shaping ring.

The bell end having obtained its desired shape, the rod 25 is first moved forward so that the hooks 28 are released from the sleeve-like portion 5, 6 after which the mandrel portion 2 of the tube portion 22 together with the tube 27 are drawn backwards with regard to the tube 3. Thereupon, the shaping ring 4, which has then become deformable can be removed by means of a hooked tool on deformation of the ring from bell end.

Finally the sleeve-like portion 5, 6 can be removed from the bell end by means of the tool controlled by the rod 25.

Figure 2:
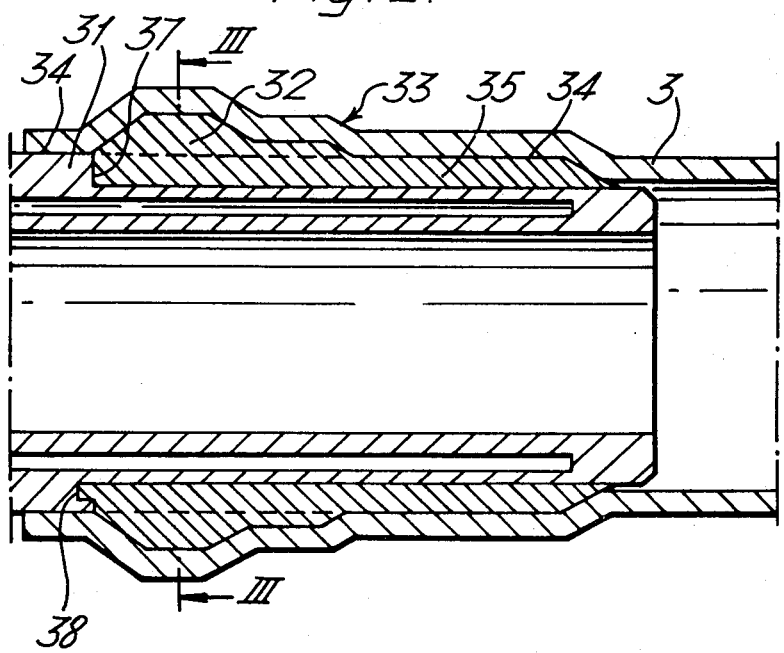
FIG. 2 is an axial section of another embodiment of the device in which only the shaping ring being slidable along the first mandrel portion, is present.
Figure 3:
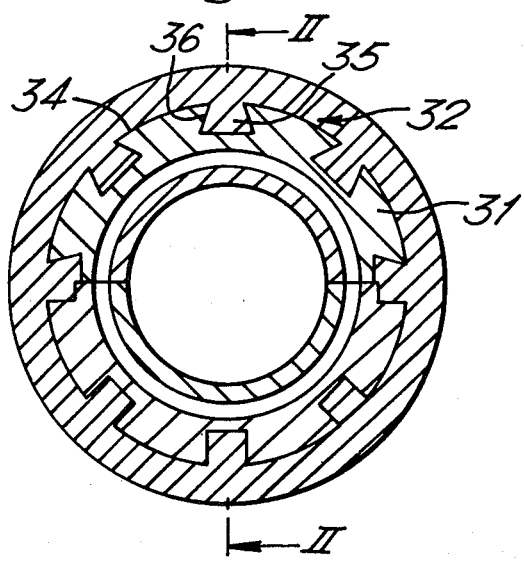
FIG. 3 is a cross section along the line III-III of FIG. 2.

In FIGS. 2 and 3 a very simple embodiment of the device has been shown, in which merely a shaping ring 32 is slidable along a mandrel portion 31 corresponding with the mandrel portion 2 of the tube end 22 of FIG. 1a. The relief of the outer surface of the mandrel is similar to that of the mandrel according to FIG. 1a. In FIG. 2 the bell end 33 shaped on the mandrel has still been shown.

The shaping ring comprises a solid portion extending radial inwardly to the outer surface 34 of the first mandrel portion 31, having a diameter which is at least almost like that of the outer surface of the tube 3 joining the bell end 33 to be shaped and, longitudinal ribs 35, which extend further radial inwardly from said solid portion, said ribs 35 engaging corresponding longitudinal grooves 36 (FIG. 3) in the above mentioned outer surface 34.

In the upper half of FIGS. 2 and 3 the cross-section of ribs and grooves has been shown dovetail-like for inhibiting radial expansion of the shaping ring, in which case the abutment 37 of the first mandrel portion limiting backward sliding movement of the shaping ring need not be provided with an undercut.

In the lower half portion of said FIGS. 2 and 3 the ribs and grooves are shown having a rectangular cross-section, in which case the abutment for the shaping ring of the first mandrel portion preferably comprises an undercut 38.

In this embodiment, the first mandrel portion 31 can be drawn from the bell end 33 after the shaping thereof, after which the shaping ring, then having become deformable, can be removed with the hooked tool.

Combinations of embodiments as described above, are possible, e.g. the shaping ring may be provided with longitudinal ribs 41 at the location indicated with a dotted line 40 in FIG. 1a, which longitudinal ribs 41 engage corresponding longitudinal grooves in the first mandrel portion 2.

I claim:

1. A mandrel for shaping a bell end of a tube of a thermoplastic material, said mandrel comprising a central cylindrical member having a hardness greater than that of said thermoplastic material, and a shaping ring slidably mounted on said central member, said shaping ring having an outer diameter greater than the outer diameter of said central member, and being of a material having a hardness between the hardness of said thermoplastic material at ambient temperature and the hardness of said thermoplastic material at the deforming temperature thereof, cooperating means on said ring and said central member inhibiting movement of said shaping ring away from the end of said mandrel beyond a predetermined location on said central member, cooperating means on said ring and said central member for inhibiting radial expansion of said shaping ring, and releasable clamping means abutting the end of said shaping ring toward the end of said mandrel for inhibiting axial movement of said shaping ring, said clamping means being freely removable from the end of said central member in its unclamped state to permit removal of said central member from within said shaping ring.

2. The mandrel of claim 1 wherein said means inhibiting movement of said shaping ring away from the end of said mandrel comprises a shoulder on said central member, said means inhibiting radial expansion comprises an axially extending groove in said shoulder, and the end of said shaping ring engaging said shoulder is provided with a projection extending into said groove.

3. The mandrel of claim 1 wherein the end of said shaping ring toward said end of said mandrel is tapered inwardly toward the end thereof, and said clamping means comprises a sleevelike member slidably positioned on the end of said central member and having one end shaped to engage the bevelled end of said shaping ring, the largest diameter of said shaping ring exceeding that of said sleeve-like member.

4. The mandrel of claim 3 in which said clamping means further comprises means for holding said sleevelike member in a fixed position on the end of said central portion, said central portion having a bore extending centrally therethrough, a rod extending through said bore, and hook means operatively coupled to said rod and pivotally mounted for engaging said sleevelike member.

* * * * *